(12) United States Patent
Fukano et al.

(10) Patent No.: US 9,360,354 B2
(45) Date of Patent: Jun. 7, 2016

(54) VORTEX FLOWMETER

(71) Applicant: SMC Corporation, Chiyoda-ku (JP)

(72) Inventors: Yoshihiro Fukano, Moriya (JP);
Tadashi Uchino, Moriya (JP)

(73) Assignee: SMC CORPORATION, Chiyoda-ku (JP)

( * ) Notice: Subject to any disclaimer, the term of this patent is extended or adjusted under 35 U.S.C. 154(b) by 16 days.

(21) Appl. No.: 14/461,640

(22) Filed: Aug. 18, 2014

(65) Prior Publication Data

US 2015/0068323 A1    Mar. 12, 2015

(30) Foreign Application Priority Data

Sep. 11, 2013   (JP) .................. 2013-187819

(51) Int. Cl.
*G01F 1/84*   (2006.01)
*G01F 1/32*   (2006.01)
*G01F 1/56*   (2006.01)

(52) U.S. Cl.
CPC ............ *G01F 1/3209* (2013.01); *G01F 1/3245* (2013.01); *G01F 1/56* (2013.01)

(58) Field of Classification Search
CPC ......................................................... G01F 1/32
USPC ........................................ 73/861.22, 861.24
See application file for complete search history.

(56) References Cited

U.S. PATENT DOCUMENTS

| | | | | |
|---|---|---|---|---|
| 4,926,532 A | * | 5/1990 | Phipps .................. | G01F 1/3218 29/25.35 |
| 4,973,062 A | * | 11/1990 | Lew ...................... | G01F 1/3263 73/861.24 |
| 5,321,990 A | * | 6/1994 | Lang ..................... | G01F 1/3218 73/861.24 |
| 7,073,394 B2 | | 7/2006 | Foster | |

FOREIGN PATENT DOCUMENTS

| | | |
|---|---|---|
| CN | 1957234 A | 5/2007 |
| JP | 10-142017 A | 5/1998 |
| JP | 11-14412 | 1/1999 |
| JP | 11-248502 A | 9/1999 |
| JP | 2002-005708 | 1/2002 |
| JP | 2002-195860 | 7/2002 |
| JP | 2005-114656 A | 4/2005 |
| JP | 2005-114657 | 4/2005 |

OTHER PUBLICATIONS

Combined Office Action and Search Report issued Jul. 9, 2015 in Taiwanese Patent Application No. 103129818 (with English language translation).
Office Action issued Jul. 21, 2015 in Korean Patent Application No. 10-2014-0118740 (with English language translation).

* cited by examiner

*Primary Examiner* — Jewel V Thompson
(74) *Attorney, Agent, or Firm* — Oblon, McClelland, Maier & Neustadt, L.L.P.

(57) ABSTRACT

An installation hole, in which a detector is accommodated, is formed in a substantially central portion of a body of a vortex flowmeter. A first ring is formed on an annular wall that forms a boundary between a first aperture portion and a second aperture portion of the installation hole. In the detector, a detecting element made up from a piezoelectric element is accommodated in a holder. A pair of second rings is formed on the outer circumferential surface of the holder. By inserting the detector in the installation hole, the second rings are placed in sliding contact with the inner circumferential surface of the installation hole, and the first ring comes into abutment with a boundary region of the holder. Consequently, a seal is formed between the detector and the body by the first and second rings.

10 Claims, 4 Drawing Sheets

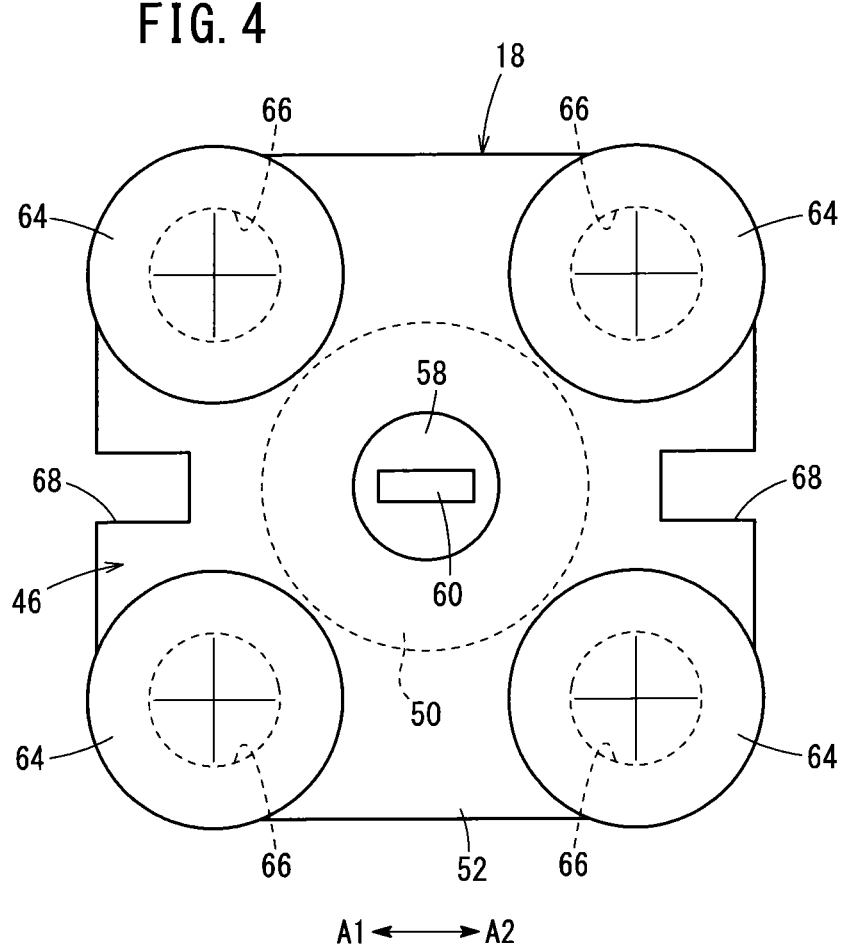

VORTEX FLOWMETER

CROSS-REFERENCE TO RELATED APPLICATION

This application is based upon and claims the benefit of priority from Japanese Patent Application No. 2013-187819 filed on Sep. 11, 2013, the contents of which are incorporated herein by reference.

BACKGROUND OF THE INVENTION

1. Field of the Invention

The present invention relates to a vortex flowmeter, which is capable of detecting the flow rate of a fluid by detecting a vortex that is generated by the flowing fluid in a vortex generating body.

2. Description of the Related Art

Heretofore, a vortex flowmeter has been known in which a vortex generating body is disposed in a flow passage of a body through which a fluid flows, and a detector, which is constituted from a piezoelectric element or the like, is disposed on a downstream side from the vortex generating body. With such a vortex flowmeter, a Karman vortex is generated as a result of the fluid that flows in the flow passage flowing past the vortex generating body, and a pressure change of the fluid due to generation of the Karman vortex is detected and converted into an electric signal by the detector to thereby measure the flow rate.

As one such vortex flowmeter, for example, as disclosed in Japanese Laid-Open Patent Publication No. 11-014412, a flow passage is formed in the interior of a measurement duct that makes up the body of the vortex flowmeter, and a detector containing therein a piezoelectric element is housed in a bore that is formed in the measurement duct. A distal end of the detector is arranged so as to project into the flow passage, and between the bore and the detector, an o-ring is disposed to prevent ingress of fluid from the flow passage.

However, in the case that a chemical solution or purified water is utilized as the fluid in the aforementioned vortex flowmeter, contaminants, which are eluted from the o-ring that is made of an elastic material, enter into the fluid and contaminate the fluid. Further, if the fluid is a strongly alkaline or a strongly acidic chemical solution, the durability of the o-ring is reduced and sealing effectiveness is deteriorated.

Thus, for solving the problems discussed above, with the vortex flowmeter disclosed in Japanese Laid-Open Patent Publication No. 2002-195860, instead of using an o-ring, the detector is connected integrally with respect to a conduit through which the fluid flows, by ultrasonic welding, whereby an effective seal is maintained between the detector and the conduit, and contamination of the fluid or degradation of the sealing ability can be prevented.

SUMMARY OF THE INVENTION

However, in the vortex flowmeter of the aforementioned Japanese Laid-Open Patent Publication No. 2002-195860, in which the detector is connected integrally to the conduit by ultrasonic welding, variances tend to occur in the quality of the weld depending on the skill of the welding operator, and a stable product quality cannot be obtained. Thus, there are concerns that variances in the sealing ability will take place, and that manufacturing costs will rise. Further, in the event of a malfunction of the detector, since the detector is welded to the conduit, the detector cannot be removed and replaced by itself, and since it is necessary to exchange or replace the entire vortex flowmeter as a whole, maintenance costs also increase.

The present invention has been devised taking into consideration the aforementioned problems and has the object of providing a vortex flowmeter in which, with a simple and inexpensive structure, an effective sealing ability can reliably and stably be obtained.

For achieving the above object, the present invention is characterized by a vortex flowmeter including a body having a flow passage therein through which a fluid flows, a vortex generating body disposed in the flow passage and configured to generate a vortex in the fluid, and a detector disposed in the interior of the body on a downstream side of the vortex generating body, wherein the body has an accommodating hole in which the detector is accommodated, an annular projection being formed on at least one of an outer surface of the detector and an inner surface of the accommodating hole, for thereby forming a seal between the inner surface and the outer surface.

According to the present invention, in the vortex flowmeter, which is equipped with the detector disposed on a downstream side of the vortex generating body in the interior of the body, the body includes the accommodating hole in which the detector is accommodated. In addition, the annular projection is formed on at least one of an outer surface of the detector and an inner surface of the accommodating hole, for thereby forming a seal between the inner surface and the outer surface.

Accordingly, by housing the detector in the interior of the accommodating hole, the annular projection, which is formed on at least one of the inner surface of the accommodating hole and the outer surface of the detector, comes into abutment against the other confronting surface, whereby a seal is established between the detector and the accommodating hole. As a result, the fluid that flows through the flow passage of the body is prevented reliably from passing between the body and the detector and invading into the interior of the vortex flowmeter. In addition, even in the event that a strongly acidic or strongly alkaline fluid is used, since a decrease in durability is suppressed and lowering of the sealing ability can be prevented in comparison to the case of the vortex flowmeter according to the conventional technology, in which sealing is performed by an o-ring, a stable sealing capability can be maintained over an extended period. Furthermore, since the o-ring, which is used by the vortex flowmeter according to the conventional technology, is rendered unnecessary, the number of parts that make up the vortex flowmeter can be reduced, and a low cost vortex flowmeter can be realized.

The above and other objects, features and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 4 is a plan view of the detector, as viewed from a flange side thereof, in the vortex flowmeter of FIG. 1.

DESCRIPTION OF THE PREFERRED EMBODIMENTS

Figure 1:
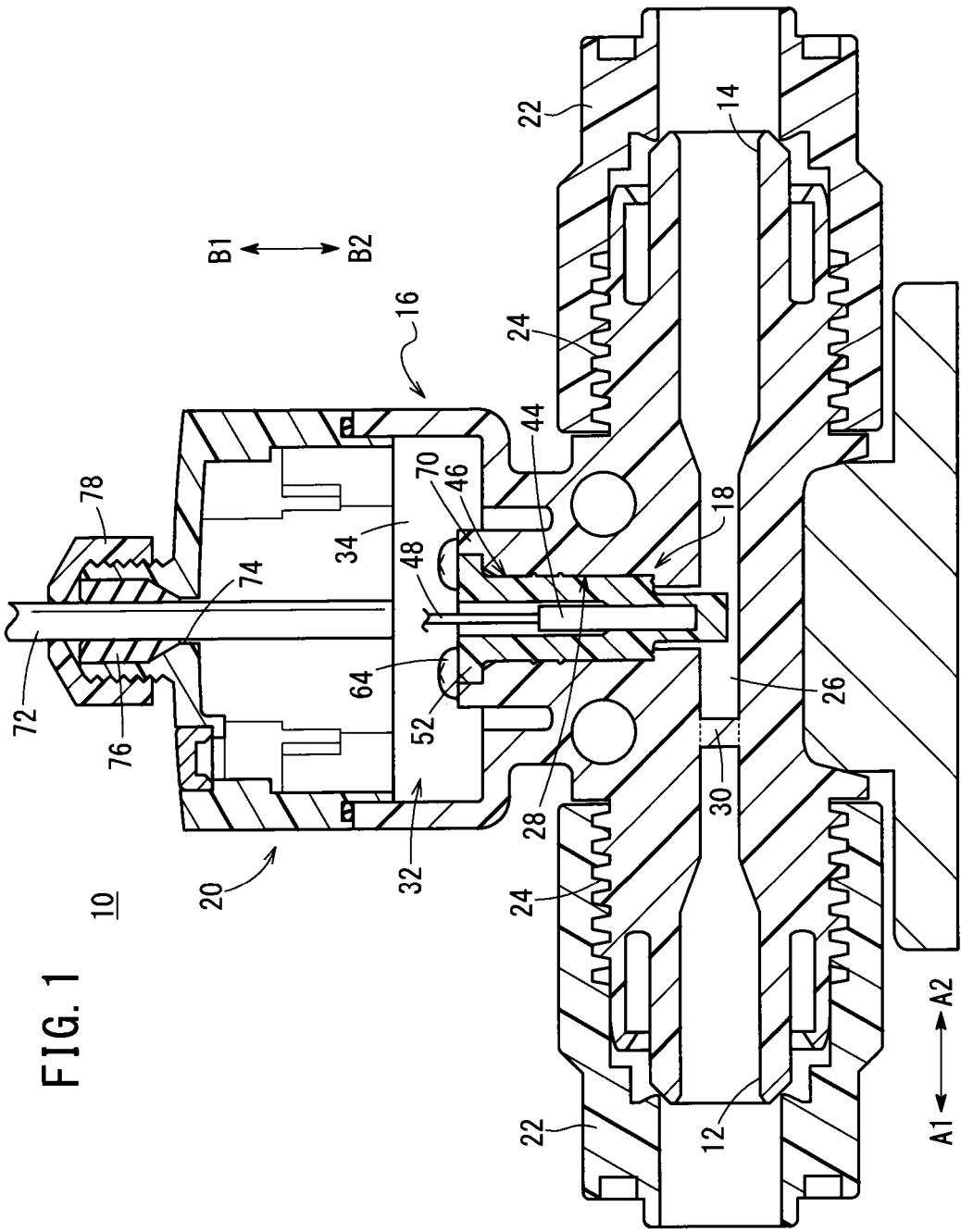
FIG. 1 is an overall cross sectional view of a vortex flowmeter according to an embodiment of the present invention.

As shown in FIG. 1, a vortex flowmeter 10 according to an embodiment of the present invention includes a body 16 having first and second ports 12, 14 to which a pressure fluid is supplied and from which the pressure fluid is discharged, a detector 18 disposed in the interior of the body 16, and a cover member 20 that closes and seals an upper portion of the body 16. For example, a chemical solution, pure water, or the like, which is employed in a semiconductor manufacturing apparatus, may be used as the pressure fluid.

The body 16 is formed with a substantially T-shape in cross section, for example, from a resin material. A first port 12 opens on one end portion of the body 16, which extends in a substantially horizontal direction, and a second port 14 opens on another end portion thereof. The first and second ports 12, 14 open respectively in horizontal directions (the directions of arrows A1 and A2), and screw threads 24 are engraved on outer circumferential surfaces of the first and second ports 12, 14 with which respective fastening members 22 are screw-engaged.

After respective tubes (not shown) are inserted over the outer circumferential sides of the first and second ports 12, 14, by screw-engagement of the cylindrical fastening members 22 through which the tubes have been inserted, with respect to the screw threads 24, the tubes are connected respectively to the first and second ports 12, 14.

The first port 12, for example, extends in a straight line with substantially the same diameter along an axial direction (the direction of arrows A1 and A2 ). Similarly, the second port 14 extends in a straight line with substantially the same diameter along the axial direction (the direction of arrows A1 and A2). A communication passage (flow passage) 26, which is reduced in diameter with respect to the first and second ports 12, 14, is formed between the first port 12 and the second port 14.

The communication passage 26, for example, is formed in a substantially central portion of the body 16, extends in a straight line with a substantially constant diameter along a substantially horizontal direction, and is reduced in diameter with respect to the first and second ports 12, 14.

Further, substantially in the center of the communication passage 26, an installation hole (accommodating hole) 28 opens in which the detector 18 is disposed. The installation hole 28 extends in a vertically upward direction (the direction of the arrow B1) perpendicular to the communication passage 26. Further, a vortex generating body 30 is disposed at a position toward the side of the first port 12 (in the direction of the arrow A1) from the center where the installation hole 28 intersects with the communication passage 26.

The vortex generating body 30, for example, is formed with a trapezoidal shape in cross section. The vortex generating body 30 is disposed in a cross sectional center of the communication passage 26, with one end thereof on the side of the first port 12 (in the direction of the arrow A1) being wide in width, and the other end thereof on the side of the second port 14 (in the direction of the arrow A2) being narrow in width.

Further, an accommodating section 32, which opens with a substantially U-shape in cross section in an upward direction (the direction of the arrow B1), is formed in an upper central portion of the body 16. A circuit board 34, which is connected to a detecting element 44 that constitutes the detector 18, is accommodated in the interior of the accommodating section 32.

Figure 2:
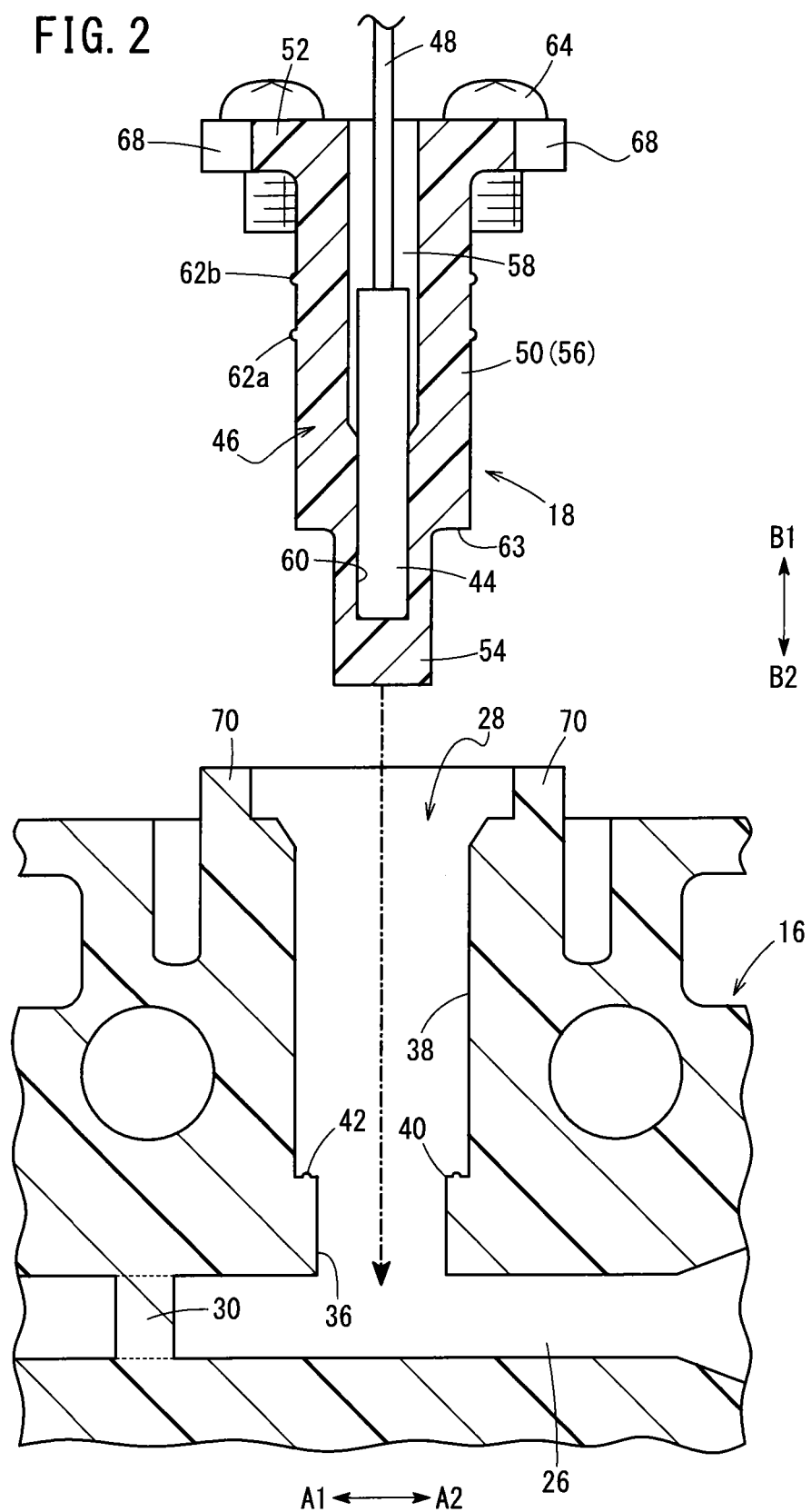
FIG. 2 is an exploded cross sectional view showing a condition in which a detector is taken out from the vortex flowmeter of FIG. 1.

As shown in FIGS. 1 and 2, the installation hole 28 is formed substantially in the center of the accommodating section 32, and extends toward the communication passage 26 (in the direction of the arrow B2). The installation hole 28, for example, is made up from a first aperture portion 36 formed on one end thereof on the side of the communication passage 26 (in the direction of the arrow B2), and a second aperture portion 38 formed on the other end thereof on the side of a retaining section 60 (in the direction of the arrow B1). Relative to each other, the first aperture portion 36 is formed with a small diameter, and the second aperture portion 38 is formed with a large diameter.

In addition, at a boundary region between the first aperture portion 36 and the second aperture portion 38, an annular wall (inner surface) 40 is formed perpendicularly to the axis of the installation hole 28, and on the annular wall 40, an annular first ring (projection) 42 is formed, which projects upwardly (in the direction of the arrow B1), i.e., toward the second aperture portion 38. The first ring 42 is formed with a semicircular shape in cross section, and protrudes by a predetermined height from the annular wall 40.

As shown in FIGS. 1 and 2, the detector 18 includes a detecting element 44, and a holder 46 inside of which the detecting element 44 is accommodated. The detecting element 44 is constituted, for example, from a piezoelectric element, which is capable of converting a pressure applied thereto into electricity. The detecting element 44 is formed as a thin plate with lead wires 48 being connected to one end thereof. In addition, the detecting element 44 is connected through the lead wires 48 to the circuit board 34.

The holder 46 includes a main body portion 50 formed in the shape of a bottomed cylinder, for example, from a resin material, and a flange 52 formed on the other end of the main body portion 50.

The main body portion 50 is formed with a circular shape in cross section, having a small diameter part 54 on one end thereof, and a large diameter part 56 on the other end side thereof and which is joined to the small diameter part 54. The main body portion 50 contains therein an accommodating hole 58 in which the detecting element 44 is accommodated. The accommodating hole 58 opens on the other end of the main body portion 50 having the flange 52, and includes a retaining section 60 in which an end of the detecting element 44 is inserted and retained. The retaining section 60 is formed with a rectangular shape in cross section corresponding to the cross sectional shape of the detecting element 44, and is formed along the axial direction (the direction of arrows B1 and B2) in straddling relation to the small diameter part 54 and the large diameter part 56.

Further, on the outer circumferential surface (outer surface) of the large diameter part 56, a pair of second rings (projections) 62a, 62b are formed, which project outwardly with a semicircular shape in cross section. The second rings 62a, 62b are formed in annular shapes on the outer circumferential surface of the large diameter part 56, and are separated from each other by a predetermined distance in the axial direction (the direction of arrows B1 and B2) of the large diameter part 56.

Figure 3:
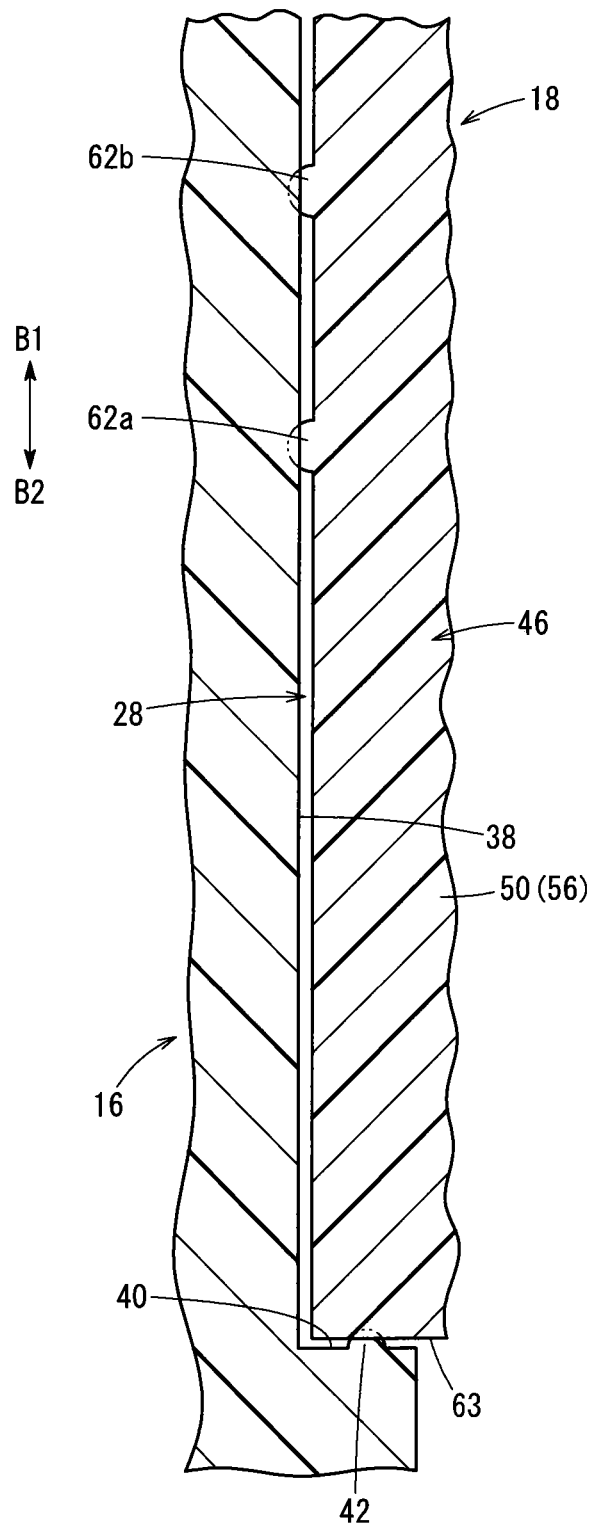
FIG. 3 is an enlarged cross sectional view showing an area in the vicinity of an outer circumferential surface of a holder in the vortex flowmeter of FIG. 1.

As shown in FIG. 3, when the detector 18 including the holder 46 is inserted into the installation hole 28, a seal is formed between the holder 46 and the installation hole 28 as a result of the second rings 62a, 62b on the main body portion 50 being placed in sliding contact with the inner circumferential surface of the second aperture portion 38 in the installation hole 28. In addition, by abutment of a boundary region (stepped portion) 63 between the small diameter part 54 and the large diameter part 56 against the first ring 42 that is formed on the annular wall 40, a seal is formed between the holder 46 and the installation hole 28.

More specifically, by abutment of the first ring 42, a seal is formed on one end of the detector 18 in the axial direction (the direction of arrows B1 and B2), and by abutment of the pair of second rings 62a, 62b, another seal is formed along the circumferential surface of the detector 18.

In greater detail, since the first and second rings 42, 62a, 62b are formed respectively from a resin material, upon insertion of the holder 46 into the installation hole 28, the first and second rings 42, 62a, 62b are pressed and deformed so that more intimate contact with the installation hole 28 is achieved to thereby increase sealing effectiveness.

As shown in FIGS. 1, 2 and 4, the flange 52 is formed with a substantially rectangular shape perpendicular to the axial direction of the main body portion 50. Bolt holes 66 through which fastening bolts 64 are inserted are formed respectively in the four corners of the flange 52, and a pair of cutout grooves (cutouts) 68 are formed respectively on outer edges of the flange 52. The cutout grooves 68 are formed symmetrically about the center of the main body portion 50, and are recessed toward the center from the outer edges at a substantially constant width.

In addition, the main body portion 50 is inserted into the installation hole 28 of the body 16, and in a state of abutment of the flange 52 against the inner wall surface of the accommodating section 32, the plural fastening bolts 64 are threaded and screw-engaged with respect to the body 16 to thereby fix the main body portion 50.

Further, a pair of positioning pieces 70 are formed along a straight line about the center of the installation hole 28 on inner wall surfaces of the accommodating section 32. The positioning pieces 70 are formed with plate-like shapes having a constant thickness, and project at a predetermined height from the inner wall surfaces (see FIG. 2). By insertion of the positioning pieces 70 into the cutout grooves 68 of the flange 52, the detector 18 can be fixed in a properly positioned state with respect to the installation hole 28 of the body 16. More specifically, the cutout grooves 68 in the holder 46 and the positioning pieces 70 on the body 16 function as a positioning unit for assembling the detector 18 at a predetermined position on the body 16.

As shown in FIG. 1, the cover member 20 is coupled to an upper part of the body 16 so as to cover the open accommodating section 32 of the body 16. In a center portion of the cover member 20, a lead-out hole 74 is formed through which wires 72, which are connected to the circuit board 34, are inserted. Moreover, by inserting the wires 72 through the lead-out hole 74, and then tightening a nut 78 together with a pressing member 76, the wires 72 are fixed with respect to the cover member 20. As a result, the circuit board 34 and other components that are accommodated in the accommodating section 32 are covered by the cover member 20 and are not exposed to the exterior.

The vortex flowmeter 10 according to the embodiment of the present invention is constructed basically as described above. Next, with reference to FIG. 2, a description shall be made concerning assembly of the detector 18 in the installation hole 28 of the body 16. In this case, it is assumed that the detecting element 44 is already in a state of being accommodated in the accommodating hole 58 of the holder 46.

At first, as shown in FIG. 2, after the holder 46 of the detector 18 has been arranged in an upward position (in the direction of the arrow B1) coaxially with the installation hole 28 in the accommodating section 32 of the body 16, the main body portion 50 is inserted into the installation hole 28.

In addition, as shown in FIG. 3, by movement of the detector 18 downwardly (in the direction of the arrow B2) along the installation hole 28, the second rings 62a, 62b formed on the outer circumferential surface of the holder 46 are placed in sliding contact with the inner circumferential surface of the second aperture portion 38, and a seal is formed between the holder 46 and the inner circumferential surface of the installation hole 28. Upon further downward movement of the detector 18 (in the direction of the arrow B2), as shown in FIG. 1, one end thereof projects into the communication passage 26, and the boundary region 63 between the small diameter part 54 and the large diameter part 56 comes into abutment against the annular wall 40 of the installation hole 28, whereupon further downward movement thereof is regulated, and the cutout grooves 68 of the flange 52 engage with the positioning pieces 70 in the accommodating section 32. At this time, the first ring 42 abuts against the boundary region 63, and a seal is established by the first ring 42 between the boundary region 63 and the annular wall 40.

Lastly, in the accommodating section 32, the fastening bolts 64 are inserted respectively through the bolt holes 66 of the flange 52, and by engagement thereof with respect to the body 16, the main body portion 50 of the detector 18 is inserted through the installation hole 28, and the detector 18 is fixed with respect to the body 16 in a state where the one end thereof is arranged in confronting relation to the communication passage 26.

Next, an explanation will be given briefly concerning operations and advantages of the vortex flowmeter 10 in which the detector 18 has been assembled in the foregoing manner.

Initially, a fluid is supplied to the first port 12 through a tube from a non-illustrated fluid supply source, the fluid passes through the communication passage 26, and flows to the second port 14. At this time, the fluid flows from an upstream side to a downstream side of the vortex generating body 30 (in the direction of the arrow A2), whereupon a Karman vortex is generated on the downstream side (in the direction of the arrow A2) of the vortex generating body 30. A pressure change due to generation of the Karman vortex is detected by the detecting element 44 of the detector 18, which is arranged on the downstream side of the vortex generating body 30. The pressure change detected by the detecting element 44 is converted into an electric signal, the electric signal is output through the lead wires 48 to the circuit board 34, and from the electric signal, the flow rate of the fluid is calculated.

At this time, although a portion of the fluid that flows through the communication passage 26 invades into the first aperture portion 36 of the installation hole 28, since a seal is formed reliably between the inner circumferential surface of the installation hole 28 and the outer circumferential surface of the holder 46 due to contact of the first and second rings 42, 62a, 62b, ingress of fluid into the accommodating section 32 (where the circuit board 34 is disposed) through a gap between the holder 46 and the installation hole 28 is reliably prevented. As a result, sealing can be performed by the first and second rings 42, 62a, 62b to reliably prevent the fluid from passing between the detector 18 and the body 16 and invading into the interior of the accommodating section 32.

Further, for example, even in the event that a strongly acidic or strongly alkaline chemical solution is used as a fluid, since a decrease in durability can be suppressed and lowering of the sealing ability can be prevented in comparison to the case of the vortex flowmeter according to the conventional technology in which sealing is performed by an o-ring, a stable sealing capability can be maintained over an extended period.

Furthermore, with a simple operation of inserting the holder 46 of the detector 18 into the installation hole 28 of the body 16, leakage of fluid through a gap between the holder 46 and the installation hole 28 can be prevented reliably and stably. Stated otherwise, compared to the vortex flowmeter of the conventional technology, in which the components thereof are joined by ultrasonic welding, effective sealing can be satisfied between the detector 18 and the body 16 easily and reliably without reliance on the skill of the welding operator.

Further still, since the o-ring is rendered unnecessary, the number of manufacturing steps for assembly of such an o-ring in a groove or the like can be reduced, and the number of parts that make up the vortex flowmeter 10 can be reduced. Therefore, manufacturing costs can be reduced, and a low cost vortex flowmeter 10 can be realized.

Moreover, in the event of a malfunction of the detector 18, it is possible to detach and replace only the detector 18. Thus, compared to the vortex flowmeter according to the conventional technology, in which the detector and the body are connected together by ultrasonic welding, ease of maintenance can be enhanced and maintenance costs can be reduced.

Further, in the aforementioned embodiment, a structure is provided in which the first ring 42 is disposed on the annular wall 40 of the body 16 which confronts the boundary region 63 of the holder 46 in the detector 18, and the second rings 62a, 62b are disposed on the outer circumferential surface of the holder 46. However, the invention is not limited to this structure. For example, the first ring 42 may be disposed on the side of the holder 46, and the second rings 62a, 62b may be disposed on the inner circumferential surface of the installation hole 28 in the body 16. Further, a plurality of the first rings 42 may be provided, and more than one pair of the second rings 62a, 62b may be provided. In this manner, the effectiveness of the seal between the body 16 and the detector 18 can be further enhanced.

Although a preferred embodiment of the present invention has been described above, the vortex flowmeter according to the present invention is not limited to the embodiment, and various changes and modifications may be made thereto without departing from the scope of the invention as set forth in the appended claims.

What is claimed is:

1. A vortex flowmeter comprising
 a body including a flow passage through which a fluid flows,
 a vortex generating body disposed in the flow passage and configured to generate a vortex in the fluid, and
 a detector disposed in an interior of the body on a downstream side of the vortex generating body,
 wherein the body has an accommodating hole in which the detector is accommodated,
 an annular projection being formed on at least one of an outer surface of the detector and an inner surface of the accommodating hole, for thereby forming a seal between the inner surface and the outer surface.

2. The vortex flowmeter according to claim 1, wherein the projection is formed on a wall portion of the accommodating hole against which a stepped portion of the detector abuts.

3. The vortex flowmeter according to claim 1, wherein the projection is formed on an outer circumferential surface of the detector and is placed in sliding contact with an inner circumferential surface of the accommodating hole.

4. The vortex flowmeter according to claim 3, wherein the projection is formed with a semicircular shape in cross section.

5. The vortex flowmeter according to claim 1, wherein the detector comprises a detecting element made from a piezoelectric element, and a holder in which the detecting element is accommodated, and on an end of the holder, a flange is provided which is fixed with respect to the body,
 further comprising a positioning unit configured to carry out positioning between the flange and the body.

6. The vortex flowmeter according to claim 5, wherein the positioning unit comprises:
 a cutout formed in the flange; and
 a positioning piece formed on the body and which is inserted into the cutout.

7. The vortex flowmeter according to claim 1, wherein the vortex generating body is formed with a trapezoidal shape in cross section, an upstream side thereof in the flow passage having a wide width, and a downstream side thereof in the flow passage having a narrow width.

8. A vortex flowmeter comprising:
 a body including a flow passage through which a fluid flows, wherein the body has an accommodating hole in which the detector is accommodated,
 a vortex generating body disposed in the flow passage and configured to generate a vortex in the fluid,
 a detector disposed in the accommodating hole and extending into the flow passage at a downstream side of the vortex generating body, and
 an annular projection formed on at least one of an outer surface of the detector that faces an inner surface of the accommodating hole and the inner surface of the accommodating hole, thereby forming a seal between said inner surface and outer surface, to seal the flow passage with respect to a portion of the accommodating hole at a side of the annular projection opposite the flow passage.

9. The vortex flowmeter according to claim 1, wherein the body is formed of a resilient material.

10. The vortex flowmeter according to claim 8, wherein the body is formed of a resilient material.

* * * * *